(12) United States Patent
Kullmann et al.

(10) Patent No.: US 12,076,804 B2
(45) Date of Patent: Sep. 3, 2024

(54) BAND-SHAPED MACHINING TOOL HAVING BUFFER PARTICLES

(71) Applicant: WIKUS-Sägenfabrik Wilhelm H. Kullmann GmbH & Co. KG, Spangenberg (DE)

(72) Inventors: Jörg H. Kullmann, Spangenberg (DE); Patrick Gleim, Neustadt (DE)

(73) Assignee: W1KUS-Sagenfabrik Wilhelm H. Kullmann GmbH & Co. KG, Spangenberg (DE)

( * ) Notice: Subject to any disclaimer, the term of this patent is extended or adjusted under 35 U.S.C. 154(b) by 43 days.

(21) Appl. No.: 17/547,629

(22) Filed: Dec. 10, 2021

(65) Prior Publication Data

US 2022/0097158 A1     Mar. 31, 2022

Related U.S. Application Data

(63) Continuation of application No. PCT/EP2020/066893, filed on Jun. 18, 2020.

(30) Foreign Application Priority Data

Jul. 2, 2019  (DE) .................... 10 2019 117 796.0

(51) Int. Cl.
  *B23D 61/12*    (2006.01)
  *B28D 1/12*     (2006.01)

(52) U.S. Cl.
  CPC ........... *B23D 61/127* (2013.01); *B28D 1/127* (2013.01)

(58) Field of Classification Search
  CPC .............................. B23D 61/127; B28D 1/127
  See application file for complete search history.

(56) References Cited

U.S. PATENT DOCUMENTS

| | | | | |
|---|---|---|---|---|
| 3,615,309 A | * | 10/1971 | Dawson | B23D 65/00 51/293 |
| 3,751,283 A | * | 8/1973 | Dawson | C23C 24/103 51/293 |
| 3,774,355 A | * | 11/1973 | Dawson | B23D 65/00 451/527 |
| 3,957,593 A | * | 5/1976 | Haack | B24D 18/0018 205/183 |

(Continued)

FOREIGN PATENT DOCUMENTS

| | | |
|---|---|---|
| CN | 106 660 138 A | 5/2017 |
| DE | 37 24 913 A1 | 2/1989 |

(Continued)

OTHER PUBLICATIONS

Catalog "Präzisions-Sägebänder", edition 2017, p. 41.
International Report on Patentability for PCT/EP2020/066893 dated Jul. 2, 2019.

*Primary Examiner* — Sean M Michalski
(74) *Attorney, Agent, or Firm* — The Sladkus Law Group

(57) ABSTRACT

A machining tool (1) includes a band-shaped tooth supporting body (2) and a plurality of teeth (3) each having a tooth tip (4) being covered with cutting particles (5) to form a plurality of geometrically undefined cutting portions. The tooth tip (4) is furthermore covered with buffer particles (6) of a different material than the cutting particles (5). The buffer particles (6) are located between the cutting particles (5).

8 Claims, 6 Drawing Sheets

(56) References Cited

U.S. PATENT DOCUMENTS

| | | | | |
|---|---|---|---|---|
| 4,659,436 | A | * | 4/1987 | Kaylor ................. B23D 61/127 205/110 |
| 5,209,216 | A | * | 5/1993 | Mogi ..................... B28D 1/082 83/831 |
| 5,511,603 | A | * | 4/1996 | Brown ...................... B22F 3/26 164/97 |
| 5,791,330 | A | * | 8/1998 | Tselesin .................. C22C 32/00 51/293 |
| 5,981,057 | A | | 11/1999 | Collins |
| 6,098,609 | A | * | 8/2000 | Ishizuka ............ B24D 18/0018 125/13.01 |
| 6,298,762 | B1 | * | 10/2001 | LaRue ................... B23D 65/00 83/838 |
| 6,383,238 | B1 | | 5/2002 | Takahashi |
| 6,883,412 | B1 | * | 4/2005 | Turfitt ................... B23D 61/14 83/835 |
| 7,089,925 | B1 | * | 8/2006 | Lin ..................... B23D 61/185 125/20 |
| 7,258,708 | B2 | * | 8/2007 | Sung ........................ B24B 1/00 451/526 |
| 7,946,907 | B2 | * | 5/2011 | Heyen .................... H01H 9/12 83/835 |
| 8,701,536 | B2 | * | 4/2014 | Heyen ................. B23D 61/026 83/835 |
| 9,828,254 | B2 | | 11/2017 | Imamura |
| 10,730,152 | B2 | * | 8/2020 | Nicolson ................ B23P 15/28 |
| 11,135,689 | B2 | * | 10/2021 | Nicolson ............. B23K 1/0056 |
| 11,819,978 | B2 | | 11/2023 | Takagi |
| 2002/0160699 | A1 | * | 10/2002 | Okina ................ B24D 18/0018 451/259 |
| 2002/0197947 | A1 | * | 12/2002 | Sagawa .................. B24B 53/12 451/540 |
| 2004/0163738 | A1 | * | 8/2004 | Pacher ................... B23D 61/18 420/109 |
| 2006/0059785 | A1 | * | 3/2006 | Sung ........................ B22F 1/18 51/298 |
| 2006/0143991 | A1 | * | 7/2006 | Sung ........................ B24B 1/00 51/307 |
| 2006/0213128 | A1 | * | 9/2006 | Sung ........................ B22F 1/17 51/307 |
| 2008/0121084 | A1 | * | 5/2008 | Vogel .................... B23D 65/00 83/835 |
| 2009/0274923 | A1 | * | 11/2009 | Hall ......................... B22F 5/08 428/564 |
| 2009/0314136 | A1 | * | 12/2009 | Culf ..................... B23K 35/327 219/121.17 |
| 2010/0213247 | A1 | * | 8/2010 | Egan ..................... C09K 3/1409 228/221 |
| 2010/0261419 | A1 | * | 10/2010 | Sung .................. B24D 18/0054 51/307 |
| 2012/0060379 | A1 | | 3/2012 | Culf |
| 2012/0310034 | A1 | * | 12/2012 | Creighton ................ A61P 9/08 977/773 |
| 2014/0237827 | A1 | | 8/2014 | Culf |
| 2014/0273778 | A1 | * | 9/2014 | Egger .................... B24D 5/123 451/542 |
| 2014/0295126 | A1 | * | 10/2014 | Noguchi .................. B28D 1/08 428/64.1 |
| 2015/0290771 | A1 | * | 10/2015 | Li ........................... B24D 3/06 51/297 |
| 2016/0214233 | A1 | * | 7/2016 | Kasuga .................. B24D 3/18 |
| 2017/0014921 | A1 | * | 1/2017 | Nicolson ................ B33Y 50/02 |
| 2017/0014959 | A1 | * | 1/2017 | Nicolson ................ C23C 14/22 |
| 2017/0120421 | A1 | | 9/2017 | Egger |
| 2019/0240865 | A1 | * | 8/2019 | Duggan .................. B24D 5/02 |
| 2020/0086407 | A1 | * | 3/2020 | Nicolson ................ B23D 61/18 |
| 2020/0306901 | A1 | * | 10/2020 | Nicolson ................ B33Y 80/00 |
| 2022/0097157 | A1 | * | 3/2022 | Kullmann ............. B23D 61/18 |

FOREIGN PATENT DOCUMENTS

| | | |
|---|---|---|
| DE | 298 14 668 U1 | 11/1998 |
| DE | 601 02 951 T2 | 3/2005 |
| DE | 10 2010 062 073 A1 | 5/2012 |
| DE | 10 2016 100 897 A1 | 7/2016 |
| EP | 0 569 770 A1 | 11/1993 |
| EP | 2 138 263 A2 | 12/2009 |
| EP | 2 428 310 A1 | 3/2012 |
| EP | 3 117 942 A1 | 1/2017 |
| JP | S 49 000318 B | 1/1974 |
| JP | 2009-196058 A | 9/2009 |
| JP | 2015-166125 A | 9/2015 |
| JP | 2016-013581 A | 1/2016 |
| JP | 2017-052087 A | 3/2017 |
| TW | 378 167 B | 1/2000 |
| WO | 2005/084879 A1 | 9/2005 |
| WO | 2013/078487 A1 | 6/2013 |
| WO | 2017 163565 A | 9/2017 |

* cited by examiner

BAND-SHAPED MACHINING TOOL HAVING BUFFER PARTICLES

CROSS REFERENCE TO RELATED APPLICATIONS

This application is a continuation of international application PCT/EP2020/066893 with an international filing date of Jun. 18, 2020 entitled "Band-shaped machining tool having buffer particles" and claiming priority to co-pending German patent application No. DE 10 2019 117 796.0 entitled "Zerspanungswerkzeug mit Pufferpartikeln" filed on Jul. 2, 2019.

FIELD OF THE INVENTION

The present invention relates to a machining tool including a band-shaped tooth supporting body and a plurality of teeth each having a tooth tip being covered with cutting particles to form a plurality of geometrically undefined cutting portions.

In contrast to saw blades including geometrically defined cutting portions, such machining tools including geometrically undefined cutting portions are often used not to machine and saw, respectively, metal, but instead other materials—such as glass, graphite, hard-burnt coal, ceramics, silicon, concrete materials, CFK, sintered materials and natural stones.

BACKGROUND OF THE INVENTION

A machining tool including a band-shaped tooth supporting body and a plurality of teeth each having a tooth tip being covered with cutting particles to form a plurality of geometrically undefined cutting portions is known as the saw band under the trademark "DIAGRIT" by the applicant, for example from the catalog "PRÄZISIONS-SÄGEBÄNDER", edition 2017, page 41 by the applicant.

A machining tool being covered with cutting particles to form a plurality of geometrically undefined cutting portions is known from German patent application DE 10 2010 062 073 A1. In addition to the cutting particles, there are lubricant structures to reduce friction.

Additional machining tools being covered with cutting particles to form a plurality of geometrically undefined cutting portions are known from documents WO 2005/084879 A1, DE 10 2016 100 897 A1 corresponding to US patent application US 2016/0214233 A1, EP 0 569 770 A1, DE 601 02 951 T2 corresponding to U.S. Pat. No. 6,383,238 B1, DE 298 14 668 U1 and WO 2013/078487 A1 corresponding to US patent applications US 2017/0120421 A1 and US 2014/0273778 A1.

SUMMARY OF THE INVENTION

The present invention relates to a machining tool including a band-shaped tooth supporting body and a plurality of teeth each having a tooth tip being covered with cutting particles to form a plurality of geometrically undefined cutting portions. The tooth tip is furthermore covered with buffer particles of a different material than the cutting particles. The buffer particles are located between the cutting particles.

The present invention also relates to a method of producing a machining tool including a band-shaped tooth supporting body and a plurality of teeth. A tooth tip of a tooth is covered with cutting particles to form a plurality of geometrically undefined cutting portions. The tooth tip of the tooth is furthermore covered with buffer particles of a different material than the cutting particles such that the buffer particles are located between the cutting particles.

Definitions

Machining tool: The production method realized by a machining tool (or chipping tool) is designated as machining (or chipping) according to DIN 8589-0. According to this standard, in machining, one distinguishes between machining with geometrically defined cutting portions and machining with geometrically undefined cutting portions. According to DIN 8589-6, sawing belongs to machining with geometrically defined cutting portions. The present machining tool works with geometrically undefined cutting portions such that it is not a sawing tool according to the mentioned standards. For this reason, the correct generalizing term of a machining tool is used in this application. Practically, machining tools from this technical field including cutting particles are nevertheless also designated as saw bands and saw blades, respectively.

Cutting particle: Cutting particles are to be understood in this application as being particles that have the effect that the workpiece is machined. They are made of a cutting material, or they include a cutting material. A cutting material is a material that is suitable for cutting and machining workpieces. Thus, the cutting particles are also cutting material particles.

Buffer particle: Buffer particles are to be understood in this application as being particles that, due to their presence and their arrangement, have the effect to create distances between the cutting particles and thus form a buffer between the cutting particles. The buffer particles at least do not eventually cause machining of the workpiece, and they thus are no cutting particles. The buffer particles may be made of different materials. However, it is also possible that the buffer particles are made of a cutting material or that they include a cutting material. The buffer particles then are cutting material particles, but no cutting particles.

Further Description

The new machining tool including geometrically undefined cutting portions is suitable to efficiently machine workpieces while ensuring a good straight movement of the machining tool at the same time.

The tooth tips of the teeth of the new machining tool are covered with at least two different types of particles having different properties and being associated with different functions.

The first type of particles are cutting particles of a cutting material as they are generally known in the prior art. The cutting particles have the effect of the workpiece being machined. The second type of particles are buffer particles serving to increase the average distances between the cutting particles.

In the prior art, when covering the tooth tip of a tooth with cutting particles, there is the problem that so called nests including an increased number of cutting particles per surface and thus a great packing density are formed. This results in, during machining, a great number of geometrically undefined cutting portions engaging the material to be machined. This results in a reduction of the cutting performance. Thereby, the feed force becomes too great which, in turn, leads to the machining tool being laterally dislocated. In this way, the straight cut is not attained as desired. To counteract this, it is possible to use an increased feed speed. However, in other portions in which the packing density of the cutting particles is smaller, this leads to these cutting particles being subjected to a greater cutting force and thus wearing out quicker. The usable lifetime of the machining tool is reduced by this.

Furthermore, there is the problem in the prior art that, with such a great packing density of the cutting particles, there are no sufficient intermediate spaces for removing the material of the machined material and thus is not removed from the cutting channel to the required extent.

These disadvantages of the prior art are now eliminated and substantially reduced, respectively, by the new buffer particles of the new machining tool. Due to the buffer particles, the creation of nests and thus a packing density of cutting particles being too great are prevented and substantially reduced, respectively. The buffer particles form some sort of spacers between the cutting particles such that the desired distances between the geometrically undefined cutting portions of the cutting particles are realized.

The buffer particles are located between the cutting particles. However, this is not to be understood such that each buffer particle has to be located exactly between two adjacent cutting particles. The exact position of the particles mostly results during manufacturing according to a stochastic distribution such that a plurality of buffer particles and/or a plurality of cutting particles may be arranged adjacent to one another. However, the other arrangement of a buffer particle exactly between two cutting particles also exists.

When the buffer particles are removed in the later course of the manufacturing method, during a separate initializing method or only after the beginning of machining, the required free spaces between the cutting particles are created to remove the machined material from the cutting channel.

The cutting particles and the buffer particles have different physical properties. They consist of different materials and/or they have been treated differently such that they are different with respect to at least one physical property allowing for associating different functions to the particles.

The physical property differentiating the cutting particles from the buffer particles is chosen and used such that the respective particle fulfills its desired function. In case of the buffer particles, this means that the geometrically undefined cutting portions being initially formed by them are later rendered ineffective or removed.

A first possibility is that the buffer particles have a lower hardness than the cutting particles. This lower hardness is used such that the buffer particles are torn down or removed during a process to which the cutting particles are also subjected, while the cutting particles are maintained. This process may be the use of the machining tool for machining or a different process being separately provided for this purpose. For example, this may be a step of the manufacturing method of the machining tool by which the buffer particles are fully or partly removed.

Alternatively or additionally, the buffer particles may have a lower heat resistance than the cutting particles. This lower heat resistance is used in the sense that the machining tool is subjected to a heat process during which such a high temperature prevails leading to complete or partial removal of the buffer particles, while the cutting particles are maintained.

Alternatively or additionally, the buffer particles may have a lower chemical resistance than the cutting particles. This lower chemical resistance is used in the sense of the machining tool being subjected to a chemical process during which a substance gets in contact with both types of particles and leads to complete or partial removal of the buffer particles, while the cutting particles are maintained.

The cutting particles and the buffer particles may be partly embedded in a metal layer, especially a galvanic deposition layer or a chemical deposition layer. Covering of the tooth tip with the cutting particles and the buffer particles then is realized during a galvanization process or a chemical metal deposition process during which a metal layer is build up on the tooth tip and the cutting particles and the buffer particles are partly fixed in the metal layer such that one part of their surface is fixedly arranged in the metal layer and the other part of their surface protrudes from the metal layer. In this way the geometrically undefined cutting portions of the cutting particles may get in contact with the material of the workpiece to be machined when using the machining tool.

The metal layer consists of metal, especially nickel, chrome or copper, that has deposited on the tooth tip as metal ion during galvanization or chemical metal deposition. The metal ions and the metal of the metal layer are not the buffer particles. The buffer particles are additional particles to be differentiated from the metal ions and the metal of the metal layer.

However, the cutting particles and the buffer particles may also be partly embedded in a differently designed bond layer. It is especially possible to use the following bond types: resin bond, ceramics bond, sintered metal bond and galvanic bond.

The covered part of the tooth tip may consist of between approximately 10 and 60%, especially between approximately 10 and 50%, especially between approximately 20 and 50%, especially between approximately 30 and 50%, buffer particles. This share (or percentage) relates to the covered surface of the tooth tip and not the entire surface of the tooth tip. Usually, there also are portions of the tooth tip which are neither covered with cutting particles nor with buffer particles. In case the tooth tip is coated with a metal layer as this has been explained above, these portions being free from cutting particles and buffer particles are also coated by the metal layer. The covering percentage of the covered part of the tooth tip approximately corresponds to the mixing proportion of these particles by which they have been provided for the covering process when the size of the cutting particles and of the buffer particles is approximately the same. The above-mentioned number ranges ensure sufficiently great distances between the cutting particles when considering the stochastic distribution to prevent the above-described negative effects during machining.

The cutting particles and the buffer particles may have approximately the same average size. As it has been described above, the mixing proportion before the covering process then approximately corresponds to the ratio of the particles on the covered tooth tip. However, it is also possible that the cutting particles and the buffer particles have different average sizes.

The average size of the cutting particles and the average size of the buffer particles may be between approximately 60 and 800 µm, especially between approximately 100 and 800 µm, especially being between approximately 200 and 800 µm, especially between approximately 300 and 800 µm, especially between approximately 400 and 800 µm, especially between approximately 500 and 800 µm, especially between approximately 500 and 700 µm, especially approximately 600 µm. Such ranges ensure that the cutting particles provide the desired geometrically undefined cutting portions and that they are spaced apart from one another by the buffer particles in the desired way.

The cutting particles may be hard or highly hard.

Hard cutting particles are especially understood as such ones being made of corundum ($Al_2O_3$) or silicon carbide (SiC).

Highly hard cutting particles may include monocrystalline diamond (MCD), polycrystalline diamond (CVD-D), polycrystalline diamond (PCD), cubic bornitride (CBN), cutting ceramics, carbide or combinations thereof.

The buffer particles may include monocrystalline diamond (MCD), polycrystalline diamond (CVD-D), polycrystalline diamond (PCD), cubic bornitride (CBN), silicon carbide, cutting ceramics, carbide, plastic, glass, ceramics, boron carbide, nickel, copper or combinations thereof.

The cutting particles may include cubic bornitride (CBN) and the buffer particles may include diamond. Since diamond dissolves at approximately 720° C. and CBN is resistant at this temperature, the lower heat resistance is used in this case to fully or partly remove the buffer particles.

The cutting particles may include diamond, silicon carbide, cutting ceramics, carbide or combinations thereof, and the buffer particles may include plastic, glass, ceramics, boron carbide, nickel, copper or combinations thereof.

It is to be understood that the machining tool does not only include one tooth having such a design, but instead a plurality, especially a great number, of such teeth. These may be all teeth of the machining tool. However, it is also possible that differently designed teeth are additionally arranged at the machining tool.

The machining tool includes a tooth supporting body at which the teeth are arranged. The teeth may be designed as one piece with the tooth supporting body or to be separate from the tooth supporting body. In the latter case, the teeth or tooth tips are fixedly connected to the tooth supporting body or tooth protrusions—especially by welding, soldiering or brazing. The tooth supporting body has an elongated band-shaped design. In other words, the machining tool is a machining band being similar are to a saw band.

The teeth are arranged at one of the narrow sides of the band-shaped tooth supporting body along its length. This corresponds to the arrangement of a saw band, and it is to be differentiated from the arrangement of a grinding belt which does not include teeth and it which the cutting particles are arranged on one of the broadsides of the grinding belt.

The teeth may be arranged at the tooth supporting body at a constant division. This means that the distance between the teeth is constant. However, it is also possible that the teeth are arranged at the tooth is supporting body at a variable division. This means that the distances between the teeth vary. Especially, between two and ten different distances may exist between the teeth at the machining tool.

The tooth supporting body is made of a suitable material. Especially, this is a metal material. Examples are spring steel and alloyed tempered steel.

The materials to be machined are especially nonmetallic inorganic materials and composite materials. These materials may be especially glass, graphite, hard-burnt coal, ceramics, silicon, concrete materials, CFK, sintered materials and natural stones. However, they may also be metal materials.

Advantageous developments of the invention result from the claims, the description and the drawings.

The advantages of features and of combinations of a plurality of features mentioned at the beginning of the description only serve as examples and may be used alternatively or cumulatively without the necessity of embodiments according to the invention having to obtain these advantages.

The following applies with respect to the disclosure—not the scope of protection—of the original application and the patent: Further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims which, however, does not apply to the independent claims of the granted patent.

The number of the features mentioned in the claims and in the description is to be understood to cover this exact number and a greater number than the mentioned number without having to explicitly use the adverb "at least". For example, if a tooth is mentioned, this is to be understood such that there is exactly one tooth or there are two teeth or more teeth. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

Figure 1:
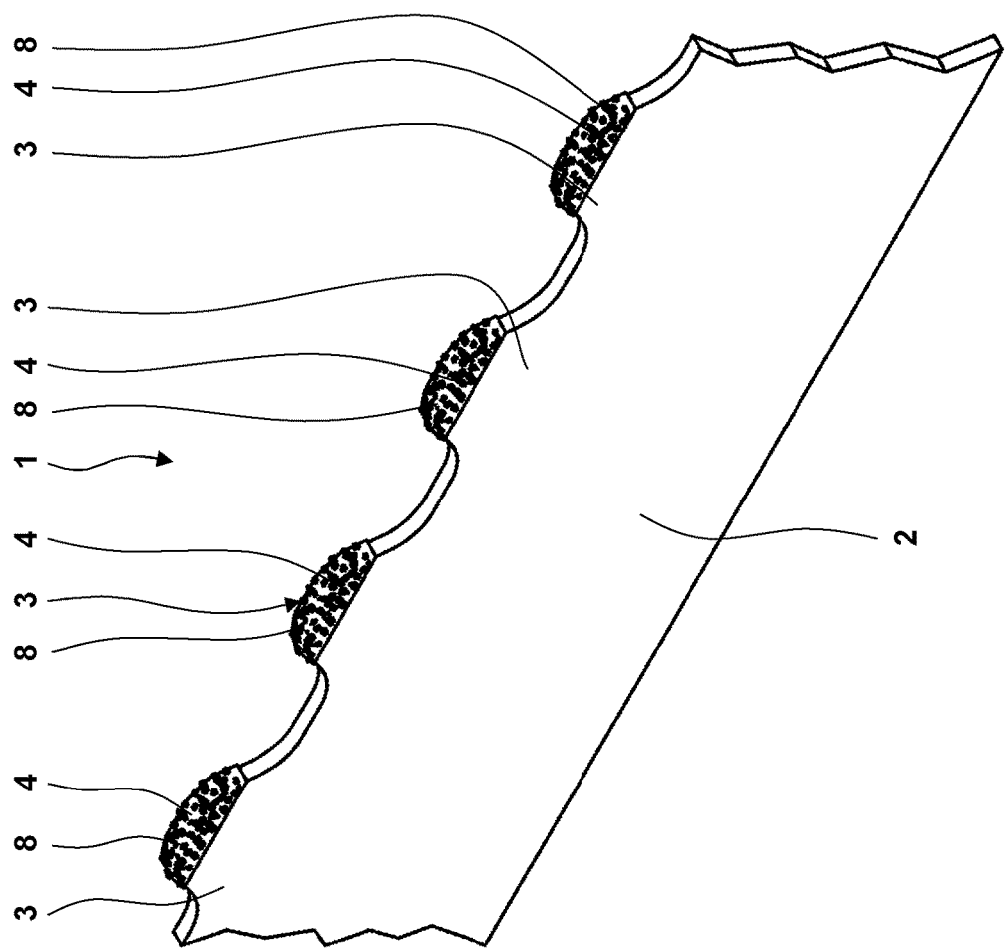
FIG. 1 illustrates a perspective view of a part of an exemplary embodiment of the new machining tool.
Figure 2:
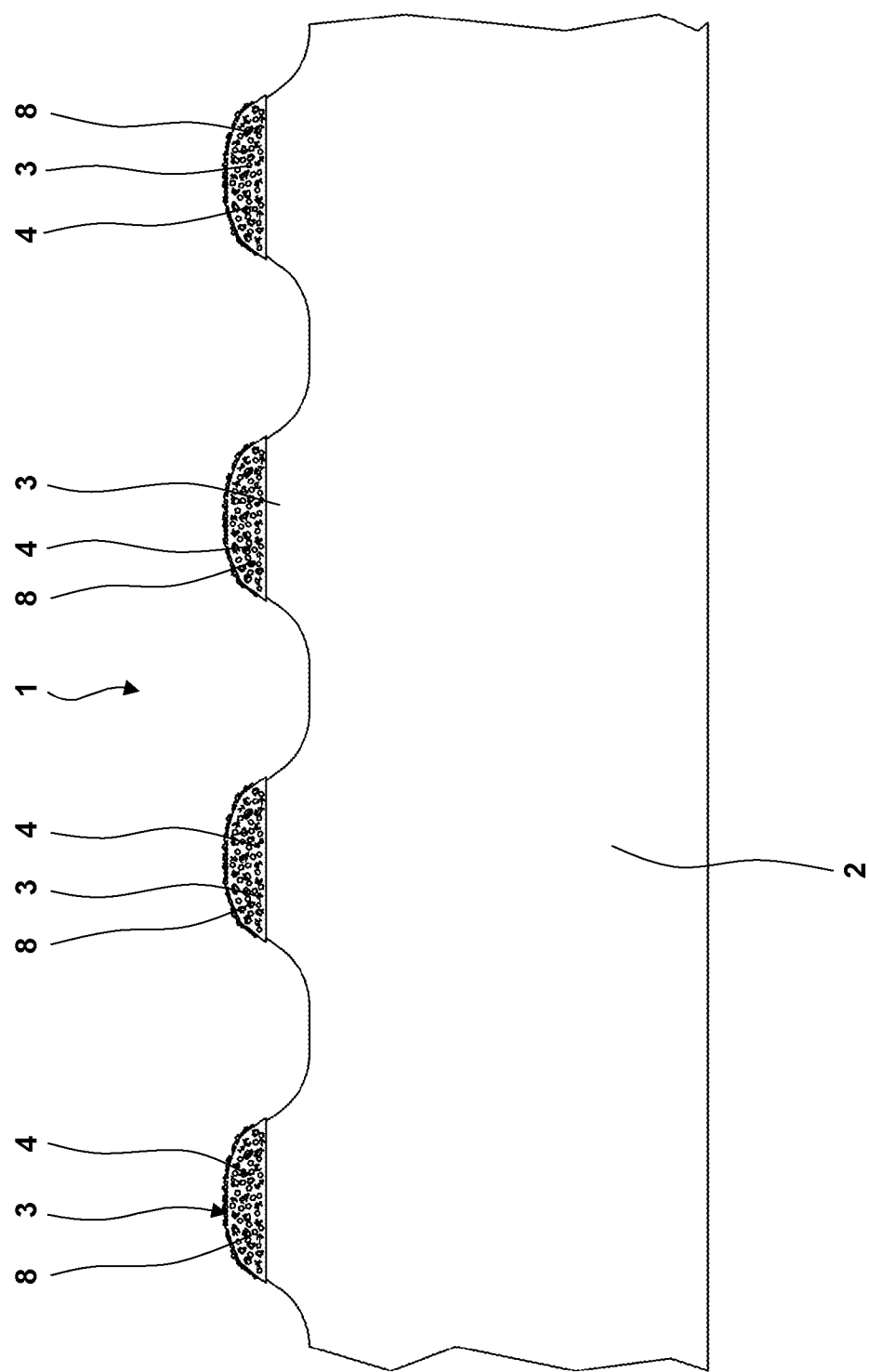
FIG. 2 illustrates a side view of the machining tool according to FIG. 1.
Figure 3:
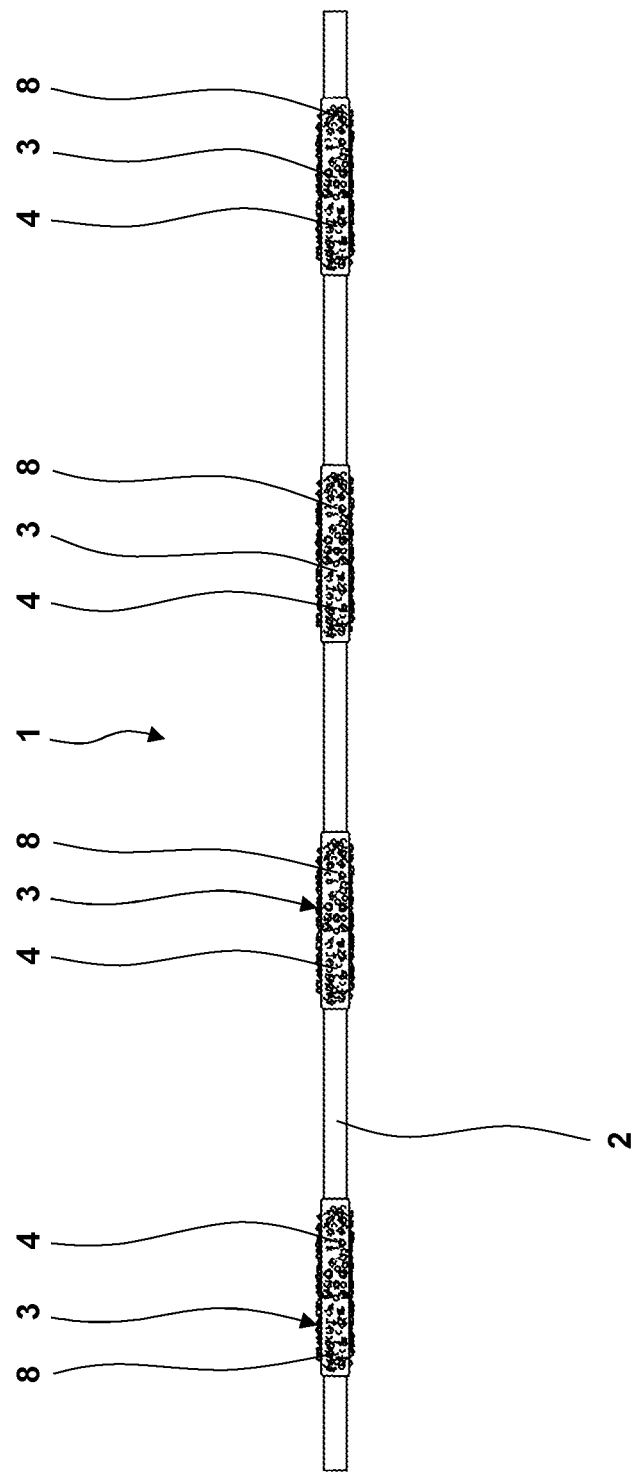
FIG. 3 illustrates a view of the machining tool according to FIG. 1 from above.
Figure 4:
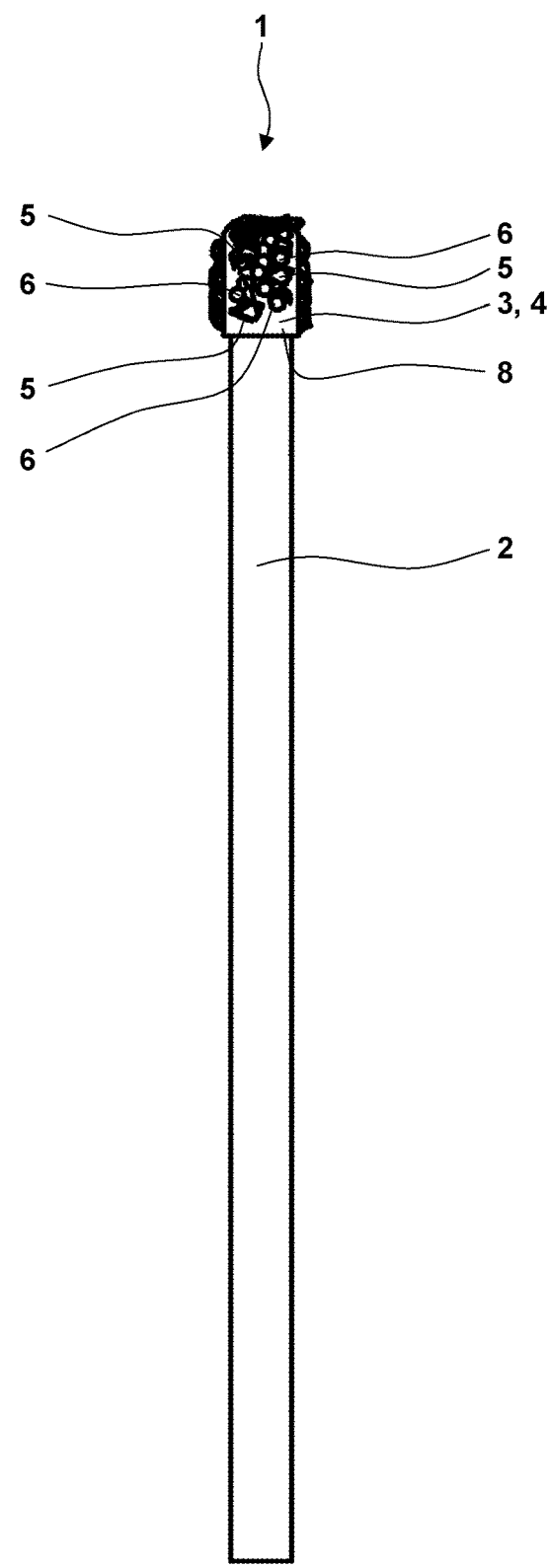
FIG. 4 illustrates a view of the machining tool according to FIG. 1 from the front.
Figure 5:
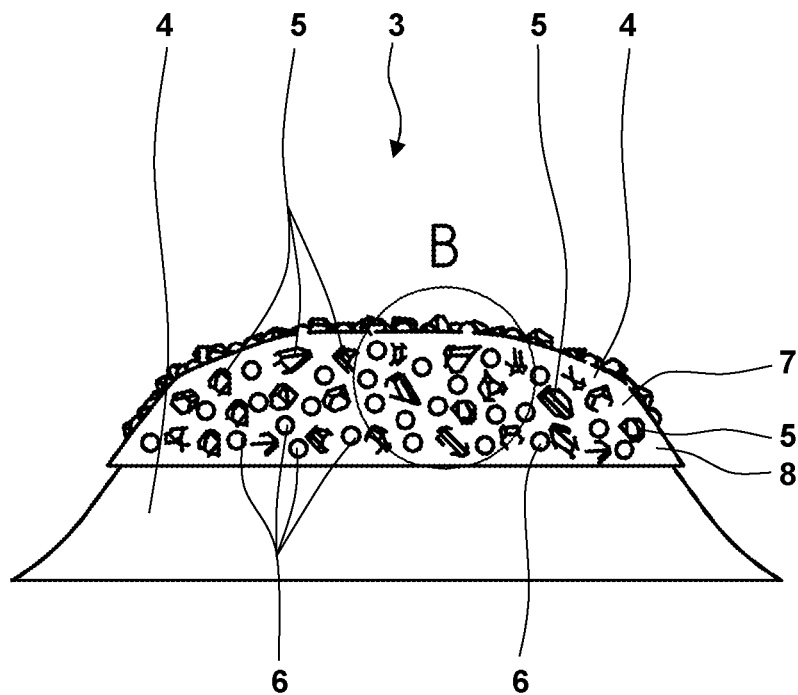
FIG. 5 illustrates a tooth tip of a tooth of the machining tool according to FIG. 1 in a view from the front.

FIG. 1-8 illustrate different views of an exemplary embodiment of a new machining tool 1. The machining tool 1 includes a tooth supporting body 2. In the present case, this is an elongated band-shaped machining tool 1 of which only a section is illustrated. It is to be understood that the machining tool 1 thus respectively extends further beyond the abruption lines shown in FIG. 1.

The machining tool 1 includes a plurality of teeth 3 being arranged at the tooth supporting body 2. The teeth 3 may be designed to be partly or fully integral with the tooth supporting body 2. In the present example, the teeth 3 are arranged at the tooth supporting body 2 with a constant division. However, they could also be arranged at the tooth supporting body 2 with a variable division.

The teeth 3 each include a tooth tip 4 facing away from the tooth supporting body 2. The tooth tip 4 is covered by (or equipped with) cutting particles 5 and buffer particles 6. The particles 5, 6 are only (partly) designated with reference signs in the enlarged illustrations of FIGS. 4-8 since they cannot be separately designated well in FIGS. 1-3 due to their small size.

The cutting particles 5 and the buffer particles 6 are fixedly arranged in a metal layer 7, and they are partly embedded in this metal layer 7. Thus, they partly protrude from the metal layer 7. The metal layer 7 especially is a galvanic deposition layer or a chemical metal deposition layer.

The cutting particles 5 and the buffer particles 6 differ with respect to their material and their functions to be fulfilled. It is herewith referred to the above-mentioned detailed explanations.

The cutting particles 5, the buffer particles 6 and the metal layer 7 commonly form a covering portion 8 which realizes the desired machining function of the machining tool 1 by including the cutting portions being required for this purpose. This covering portion 8 extends over the entire tooth tip 4 or a part of the tooth tip 4. This is the covered part of the tooth tip 4.

Figure 6:
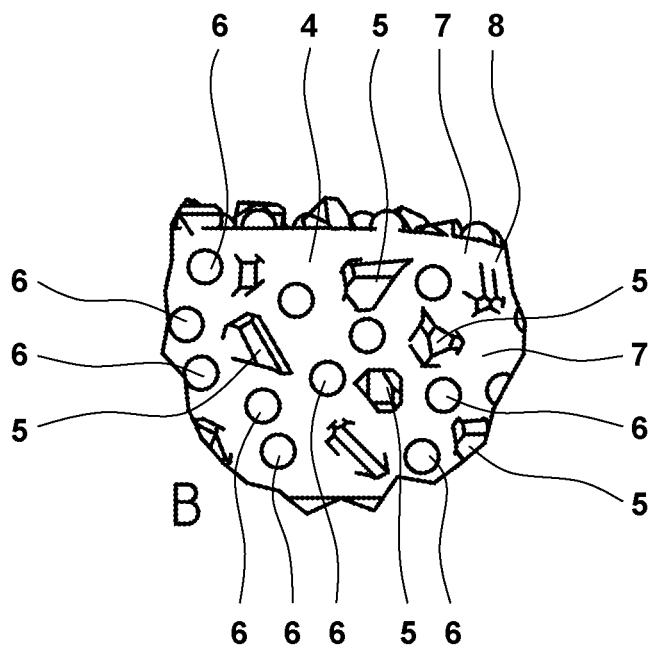
FIG. 6 illustrates the detail B of the tooth tip from FIG. 5.
Figure 7:
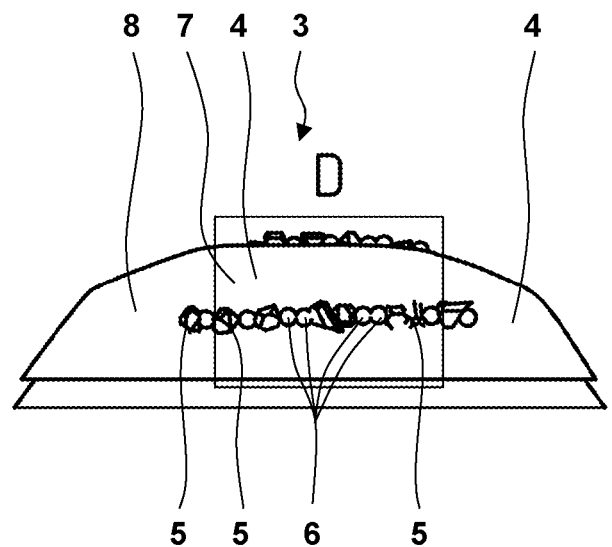
FIG. 7 shows another illustration of a tooth tip of a tooth of the machining tool omitting most particles.

The arrangement of the cutting particles 5 and of the buffer particles 6 is to be especially well seen in FIG. 6. It is to be understood that this is no true to scale illustration and that the shape of the particles 5, 6 practically is different or may be different. The particles 5, 6 may also have approximately the same shape. The illustration intends to make it possible to differentiate the particles 5, 6 and to emphasize that, due to the arrangement of the buffer particles 6, one attains free spaces between the cutting particles 5. These free spaces would not exist or not to such an extent when only arranging cutting particles 5 as this is known in the prior art.

Figure 8:
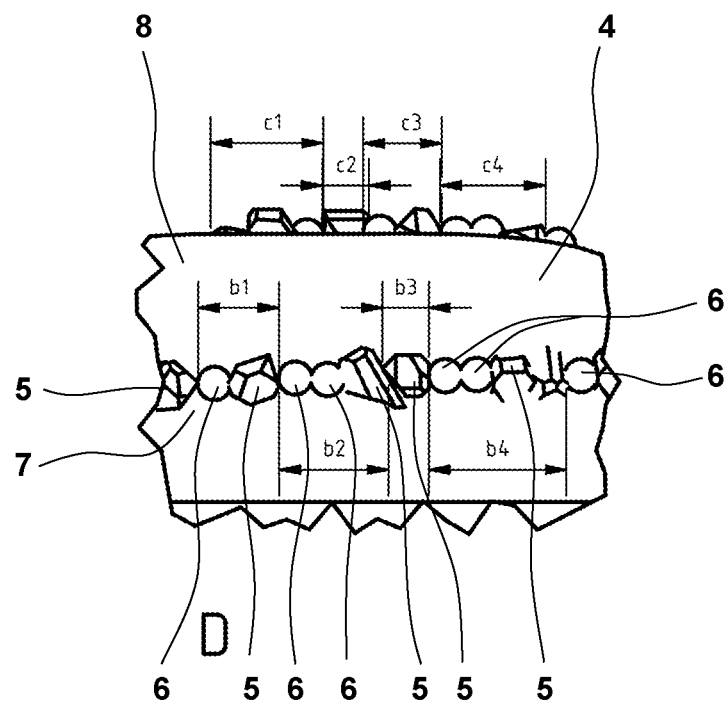
FIG. 8 illustrates the detail D of the tooth tip from FIG. 7.

FIG. 8 is a symbolic illustration further emphasizing the distances between the cutting particles 5 that can be realized due to the buffer particles 6. It is to be seen by the illustrated distances b1, b2, b3, b4, c1, c2, c3 and c4 that the distances between the buffer particles 6 have different sizes and such substantial sizes preventing nests of cutting particles 5 from being formed.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method for producing a cutting tool comprising the steps of:
    coating a portion of a tooth tip of a tooth with cutting particles to form a plurality of geometrically undefined cutting edges;
    coating a portion of the tooth tip of the tooth with buffer particles having a circular cross-sectional shape and being made of a different material than the cutting particles in such a way that the buffer particles are located between cutting particles; and
    removing the buffer particles so that free spaces are defined between the cutting particles.

2. The method of claim 1, wherein the steps of coating with cutting particles and buffer particles are carried out simultaneously.

3. The method of claim 1, wherein prior to removing the buffer particles, the cutting particles and the buffer particles are partly embedded in a metal layer, and wherein the metal layer is a galvanic deposition layer or a chemical deposition layer.

4. The method of claim 3, wherein the metal layer consists of metal that has deposited on the tooth tip as metal ions during galvanization or chemical metal deposition, the metal ions and the metal of the metal layer not being the buffer particles.

5. The method of claim 1, wherein the buffer particles are removed in the later course of the manufacturing method, during a separate initializing method or only after the beginning of machining.

6. The method of claim 1, wherein the cutting particles are irregularly-shaped.

7. The method of claim 1, wherein the circular cross-sectional shapes of the buffer particles have the same diameter.

8. The method of claim 1, wherein the cutting particles are irregularly-shaped and wherein the circular cross-sectional shapes of the buffer particles have the same diameter.

* * * * *